United States Patent [19]
Jubb

[11] Patent Number: 5,998,315
[45] Date of Patent: *Dec. 7, 1999

[54] STRONTIUM ALUMINATE INORGANIC FIBERS

[75] Inventor: Gary Anthony Jubb, Stourport-on-Severn, United Kingdom

[73] Assignee: Morgan Crucible Company PLC, Windsor, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,415

[22] PCT Filed: Jul. 31, 1995

[86] PCT No.: PCT/GB95/01797

§ 371 Date: Jan. 28, 1997

§ 102(e) Date: Jan. 28, 1997

[87] PCT Pub. No.: WO96/04214

PCT Pub. Date: Feb. 15, 1996

[30] Foreign Application Priority Data

Aug. 2, 1994 [GB] United Kingdom ................ 9415586
Apr. 28, 1995 [GB] United Kingdom ................ 9508683

[51] Int. Cl.⁶ .................... C03C 13/06; C04B 35/10
[52] U.S. Cl. ...................... 501/36; 501/95.1; 501/128
[58] Field of Search ................ 501/8, 35, 36, 501/95, 73, 128, 95.1

[56] References Cited

U.S. PATENT DOCUMENTS

| | | |
|---|---|---|
| 2,051,279 | 8/1936 | Thorndyke . |
| 2,116,303 | 5/1938 | Coss . |
| 2,155,107 | 4/1939 | Tyler et al. . |
| 2,308,857 | 1/1943 | Bowes . |
| 2,428,810 | 10/1947 | Powell . |
| 2,520,168 | 8/1950 | Powell . |
| 2,520,169 | 8/1950 | Powell . |
| 2,576,312 | 11/1951 | Minnick . |
| 2,577,431 | 12/1951 | Powell . |
| 2,823,416 | 2/1958 | Powell . |
| 3,348,956 | 10/1967 | Ekdahl . |
| 3,449,137 | 6/1969 | Ekdahl . |
| 3,799,836 | 3/1974 | Rogers et al. . |
| 3,887,386 | 6/1975 | Majumdar . |
| 4,036,654 | 7/1977 | Yale et al. . |
| 4,047,965 | 9/1977 | Karst et al. ................ 501/128 |
| 4,054,472 | 10/1977 | Kondo et al. . |
| 4,055,434 | 10/1977 | Chen et al. . |
| 4,153,439 | 5/1979 | Tomic et al. . |
| 4,205,992 | 6/1980 | Mogensen et al. . |
| 4,238,213 | 12/1980 | Pallo et al. . |
| 4,251,279 | 2/1981 | Ekdahl . |
| 4,274,881 | 6/1981 | Langton et al. . |
| 4,325,724 | 4/1982 | Froberg . |
| 4,342,581 | 8/1982 | Neubauer et al. . |
| 4,351,054 | 9/1982 | Olds . |
| 4,366,251 | 12/1982 | Rapp . |
| 4,377,415 | 3/1983 | Johnson et al. . |
| 4,437,192 | 3/1984 | Fujiu et al. . |
| 4,443,550 | 4/1984 | Kume et al. . |
| 4,482,541 | 11/1984 | Telfer et al. . |
| 4,555,492 | 11/1985 | Ekdahl et al. . |
| 4,615,988 | 10/1986 | Le Moigne et al. . |
| 4,661,134 | 4/1987 | Hartung . |
| 4,678,659 | 7/1987 | Drake et al. . |
| 4,693,740 | 9/1987 | Noiret et al. . |
| 4,957,559 | 9/1990 | Tiesler et al. . |
| 5,032,552 | 7/1991 | Nonami et al. . |
| 5,055,428 | 10/1991 | Potter . |
| 5,108,957 | 4/1992 | Cohen et al. . |
| 5,121,748 | 6/1992 | Ditz et al. . |
| 5,135,893 | 8/1992 | Dohi et al. . |
| 5,217,529 | 6/1993 | Tiesler et al. . |
| 5,248,637 | 9/1993 | Taneda et al. . |
| 5,250,488 | 10/1993 | Thelohan et al. . |
| 5,312,806 | 5/1994 | Mogensen . |
| 5,332,699 | 7/1994 | Olds et al. ................ 501/36 |
| 5,346,868 | 9/1994 | Eschner ................ 501/36 |
| 5,407,872 | 4/1995 | Komori et al. ................ 501/35 |
| 5,552,213 | 9/1996 | Eschner et al. ................ 501/36 |
| 5,583,080 | 12/1996 | Guldberg et al. ................ 501/35 |

FOREIGN PATENT DOCUMENTS

| | | |
|---|---|---|
| 255803 | 7/1963 | Australia . |
| 588493 | 12/1959 | Canada . |
| 2017344 | 11/1990 | Canada . |
| 0019600 | 11/1980 | European Pat. Off. . |
| 0076677 | 4/1983 | European Pat. Off. . |
| 0 144 349 | 6/1985 | European Pat. Off. . |
| 399652 | 11/1990 | European Pat. Off. . |
| 0585547 | 3/1994 | European Pat. Off. . |
| 0586797 | 3/1994 | European Pat. Off. . |
| 0588251 | 3/1994 | European Pat. Off. . |
| 586797 | 3/1994 | European Pat. Off. . |
| 0591696 | 4/1994 | European Pat. Off. . |

(List continued on next page.)

OTHER PUBLICATIONS

Ohta and Y. Suzuki, Chemical Durability of Glasses in the Systems $SiO_2$–$CaO$–$Na_2O$–$R_mO_n$, Ceramic Bulletin, vol. 57, No. 6 pp. 602–604 (1978).

J. Mohr and W. Rowe, *Fiber Glass,* pp. 4–23. (No Date).

J. Bauer, et al., "Solubility and Durability of Manmade Mineral Fibers in Physiological Fluids" (nineteen pages; dated no later than 1988).

"Advertisement for the Sale of a Fiber Glass Blanket Under the Name New Super Wool ™," published after Sep. 1986 (on or about Jan. 1987).

(List continued on next page.)

*Primary Examiner*—Karl Group
*Attorney, Agent, or Firm*—Dean W. Russell, Esq.; Bruce D. Gray, Esq.; Kilpatrick Stockton LLP

[57] ABSTRACT

Inorganic fibers are disclosed, vacuum preforms of which have a shrinkage of 3.5% or less when exposed to 1260° C. for 24 hours. The fibers have a composition comprising SrO, $Al_2O_3$, and sufficient fiber forming additive to allow fiber formation but not so much as to increase shrinkage beyond 3.5%. A preferred range of fibers has a shrinkage of 3.5% or less when exposed to 1500° C. for 24 hours and may comprise (in weight percent): SrO 53.2%–57.6%, $Al_2O_3$ 30.4–40.1%, $SiO_2$ 5.06–10.1%.

23 Claims, No Drawings

FOREIGN PATENT DOCUMENTS

| | | |
|---|---|---|
| 1942991 | 3/1970 | Germany . |
| 51-13819 | 2/1976 | Japan . |
| 51-133311 | 11/1976 | Japan . |
| 52-4519 | 1/1977 | Japan . |
| 52-139113 | 11/1977 | Japan . |
| 56-54252 | 5/1981 | Japan . |
| 607807 | 5/1978 | U.S.S.R. . |
| 520247 | 4/1939 | United Kingdom . |
| 790397 | 2/1958 | United Kingdom . |
| 810773 | 3/1959 | United Kingdom . |
| 1209244 | 10/1970 | United Kingdom . |
| 1273205 | 5/1972 | United Kingdom . |
| 1446910 | 8/1976 | United Kingdom . |
| 2011379 | 7/1979 | United Kingdom . |
| 2081703 | 2/1982 | United Kingdom . |
| 2083017 | 3/1982 | United Kingdom . |
| 2122537 | 1/1984 | United Kingdom . |
| 2 150 553 | 7/1985 | United Kingdom . |
| 2164557 | 3/1986 | United Kingdom . |
| WO 85/02394 | 6/1985 | WIPO . |
| WO 86/04807 | 8/1986 | WIPO . |
| WO 87/05007 | 8/1987 | WIPO . |
| WO 89/12032 | 12/1989 | WIPO . |
| WO 90/02713 | 3/1990 | WIPO . |
| WO 90/11756 | 10/1990 | WIPO . |
| WO 91/11403 | 8/1991 | WIPO . |
| WO 92/07801 | 5/1992 | WIPO . |
| WO 92/09536 | 6/1992 | WIPO . |
| WO 93/19596 | 10/1993 | WIPO . |
| WO 93/22251 | 11/1993 | WIPO . |
| WO 94/14717 | 7/1994 | WIPO . |
| WO 94/14718 | 7/1994 | WIPO . |
| WO 94/23801 | 10/1994 | WIPO . |
| WO 95/21799 | 8/1995 | WIPO . |
| WO 95/29135 | 11/1995 | WIPO . |
| WO 95/31410 | 11/1995 | WIPO . |
| WO 95/31411 | 11/1995 | WIPO . |
| WO 95/32925 | 12/1995 | WIPO . |
| WO 95/32926 | 12/1995 | WIPO . |
| WO 95/32927 | 12/1995 | WIPO . |
| WO 95/35265 | 12/1995 | WIPO . |
| WO 96/01793 | 1/1996 | WIPO . |
| WO 96/04213 | 2/1996 | WIPO . |
| WO 96/14274 | 5/1996 | WIPO . |
| WO 96/16913 | 6/1996 | WIPO . |
| WO 96/30314 | 10/1996 | WIPO . |
| WO 97/16386 | 5/1997 | WIPO . |
| WO 97/21636 | 6/1997 | WIPO . |
| WO 97/29057 | 8/1997 | WIPO . |
| WO 97/30002 | 8/1997 | WIPO . |

OTHER PUBLICATIONS

"The Dissolution of Asbestos Fibres in Water," Gronow, J., *Clay Minerals,* vol. 22, pp. 21–35 (1987).

"Man–Made Vitreous Fibers: An Overview of Studies on Their Biologic Effects," Gross, P., *Am. Ind. Hyg. Assoc., J.,* vol. 47, No. 11, 717–723 (1986).

"Solubility of Asbestos and Man–Made Fibers In Vitro and In Vivo: Its Significance in Lung Disease," Morgan, A., et al., *Environmental Research,* vol. 39, pp. 475–484 (1986).

"Corrosion Phenomena in Glass Fibers and Glass Fiber Reinforced Thermosetting Resins," Bledzki, A. et al., *Composites Science & Technology,* Harris and Chou,eds., Elsevier Applied Science Publishers, vol. 23, pp. 263–285 (1985).

"Fiber Toxicology," Leineweber, J.P., *J. Occupational Medicine,* vol. 23, No. 6, pp. 431–434 (1981).

"Development of a Deoiling Process for Recycling Millscale," Recycling in the Steel Industry, Proceedings of the 1st Process Technology Conference, vol. 1, pp. 184–187, Washington, D.C., (Mar. 25–26, 1980).

"Effects of Glass Suface Area to Solution Volume Ratio on Glass Corrosion," Ethridge, E.C. et al., *Physics and Chemistry of Glasses,* vol. 20, No. 2, pp. 35–40 (1979).

"Glass Compositions for Glass Fibers," Moriya, Ichiro, et al., *Chemical Abstracts,* vol. 89, No. 22, p. 28, Abstract 184615W (1978).

"Glass for Making Glass Fiber," Grigor'ev, V.S., et al., *Chemical Abstracts,* vol. 81, No. 22, Abstract 140076b (1974).

"Dissolution Kinetics of Magnesium Silicates," Luce, R.W., et al., *Geochimica et Cosmochimica Acta.,* vol. 36, pp.35–50 (1972).

"Nuclear Waste Glass Durability: 1, Predicting Environmental Response from Thermodynamic (Pourbaix) Diagrams," C.M. Jantzen, Journal of American Ceramic Society 75[9] (1992) 2433–48.

"Prediction of Nuclear Waste Glass Durability From Natural Analogs," C.M. Jantzen, Advances in Ceramics vol. 20 Nuclear Waste Management II (1986).

"Predictions of Glass Durability as a Function of Glass Composition and Test Conditions: Thermodynamics and Kinetics," C.M. Jantzen, Advances in the Fusion of Glass 24. 1–24.17.

"A new approach to predicting the durability of glasses from their chemical compositions," R.G. Newton & A. Paul, Glass Technology 21[6](1980) 307–309.

"Glass–water interactions," H. Scholze, Journal of Non–Crystalline Solids, 102(1988) 1–10.

"Chemical Durability of Glass" Chapter 6 from "Chemistry of Glasses" 2nd Edition A. Paul 1990.

"The Behavior of mineral fibres in physiological Solutions," H. Föster, Proceedings of 1982 WHO IARC Conference, Copenhagen, Vol. 2, pp. 27–55 (1988).

Chemical Abstracts vol. 110 No. 10, abstract No. 81274g (1989) (equivalent to CN–A–87 108257).

Database WPIL Section Ch., Week 8218 Class L AN 82–36551E (equivalent JP–B–57016938).

"The reactions of MMMF in a physiological model fluid and in water" R. Klingholtz & B. Steinkopf, Proceedings of 1982 WHO IARC Conference, Copenhagen, vol. 2, pp. 61–86 (1988).

"Solubility of fibres in vitro and in vivo," J.P. Leinweber, Proceedings of 1982 WHO IARC Conference, Copehagen, vol. 2, pp. 87–101 (1988).

"In vitro study on siliceous fibres," H. Scholze & R. Conradt, Proceedings of 1982 WHO IARC Conference, Copehagen (1986).

"An in vitro Study of the Chemical Durability of Siliceous fibres," H. Scholze & R. Conradt, Annals of Occupational Hygiene 31, 48 (1987) 683–692.

"Chemical durability of asbestos and of man–made mineral fibres in vivo," B. Bellman et al., Aerosol Scientist, vol. 17 No. 3 pp. 341–345, 1986.

Brochure showing Manville Corporation Superwool product (two pages).

Brochure showing Morgan Crucible Superwool product (two pages).

Brochures showing Carborundum Company Insulfrax product (sixteen pages).

"A scale of acidity and basicity in glass"—Glass Industry, Kuan–Hun Sun (1948).

Kirk & Othmer Encyclopedia of Chemical Technology, vol. 9, pp. 122–132, "Mineral Wool" (copyright 1952).

U.S. Bureau of Mines Circular "Mineral Wool" I.C. 6984R dated Jun. 1939.

"Slag Wools," Inorganic Fibres, pp. 111–127.

"Multi component silicate glasses," Molecular Structure, pp. 28–31.

"Chemical Durability," Chapter 34 of "Glass Science and Technology," Elsevier, 1988.

"Thermodynamic model of natural, medieval and nuclear waste glass durability," C.M. Jantzen & M.J. Plodinec, Journal of Non–Crystalline Solids 67 (1984) 208–233.

"Stability and Radioactive Waste Glasses Assessed from Hydration Thermodynamics" M.J. Plodinec, C.M. Jantzen, & G.G. Wicks, *Scientific Basis for Nuclear Waste Management VII,* (G.L. McVay Editor) pp. 755–762 (1984).

Brochure regarding PARGAS–Platten 1000° C mineral wool plates (three pages).

"Inviscid spinning of Filaments via Chemical Jet Stabilization" R.E. Cunningham, L.F. Rakestraw & S.A. Dunn American Institute of Chemical Engineers Symposium Series No. 180 vol. 74, pp. 20–31 (1978).

"Low–cost Reinforcing Fibres Promose a High Level of Performance" S.A. Dunn, Modern Plastics International, pp. 50–51 (1989).

"Calcium Aluminate glass fibres: drawing from supercooled melts versus inviscid melt spinning" F.T. Wallenberger, N.E. Weston & S.D. Brown, Materials Letters vol. 11 pp. 229–235 (1991).

"Standard Test Method for Fire Tests of Building Construction and Materials," ASTN E119–88 Annual Book of ASTM Standards.

STRONTIUM ALUMINATE INORGANIC FIBERS

BACKGROUND OF THE INVENTION

1. Field of the Invention

This invention relates to man-made inorganic oxide fibres. The invention also relates to products formed from such fibres.

2. Description of the Related Art

Inorganic fibrous materials are well known and widely used for many purposes (e.g. as thermal or acoustic insulation in bulk, mat, or blanket form, as vacuum formed shapes, as vacuum formed boards and papers, and as ropes, yarns or textiles; as a reinforcing fibre for building materials; as a constituent of brake blocks for vehicles). In most of these applications the properties for which inorganic fibrous materials are used require resistance to heat, and often resistance to aggressive chemical environments.

Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health. Whether this mechanism is true or not regulatory agencies have indicated a desire to categorise any inorganic fibre product that has a respiratory fraction as hazardous, regardless of whether there is any evidence to support such categorisation. Unfortunately for many of the applications for which inorganic fibres are used, there are no realistic substitutes.

Accordingly there is a demand for inorganic fibres that will pose as little risk as possible (if any) and for which there are objective grounds to believe them safe.

One line of study has proposed that if inorganic fibres were made that were sufficiently soluble in physiological fluids that their residence time in the human body was short; then damage would not occur or at least be minimised. As the risk of asbestos linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, the fibres should be safer than fibres which are not so soluble. The shorter the time a fibre is resident in the body the less damage it can do.

Such fibres are exemplified by the applicant's earlier International Patent Applications WO93/15028 and WO94/15883 which disclose saline soluble fibres usable at temperatures of 1000° C. and 1260° C. respectively.

An alternative line of study has proposed that hydratable fibres that lose their fibrous nature in body fluids may offer another route to "safe" fibres in that the shape and size of the fibres may be what is causing damage. This route is exemplified by European Patent Application Nos. 0586797 and 0585547 which are aimed at providing silica free compositions and which disclose two calcium aluminate compositions (one containing 50/50 wt % alumina/calcined lime and the other disclosing 63/30 wt % alumina/calcined lime with additions of 5% $CaSO_4$ and 2% other oxides). Such fibres hydrate readily so losing their fibrous nature. Asbestos does not hydrate and seems to maintain its fibrous shape in body fluid effectively indefinitely.

SUMMARY OF THE INVENTION

The applicants have found that strontium aluminate compositions do not appear to form fibres when blown from a melt whereas such compositions including additives such as silica do form fibres when blown from a melt. Such fibres appear to hydrate in the manner of calcium aluminate fibres and additionally show the potential for high temperature use. Vacuum formed performs of some such fibres show shrinkages of 3.5% or less when exposed to 1260° C. for 24 hours; some show shrinkages of 3.5% or less when exposed to 1400° C. for 24 hours; and some even show shrinkages of 3.5% or less when exposed to 1500° C. for 24 hours. Such fibres provide a hydratable high temperature fibre usable in the products recited above.

Accordingly the present invention provides an inorganic fibre, a vacuum cast preform of which having a shrinkage of 3.5% or less when exposed to 1260° C. for 24 hours, the fibre comprising SrO, $Al_2O_3$, and sufficient amount of a fibre forming additive to allow fibre formation, but not so much as to increase shrinkage beyond 3.5%.

Preferably the fibre forming additive comprises $SiO_2$ and the constituents SrO, $Al_2$ and $SiO_2$ comprise at least 90 wt % (more preferably at least 95 wt %) of the fibre composition.

Desirably, the inorganic fibres described above comprise SrO in an amount between 41.2 wt % and 63.8 wt % and $Al_2O_3$ in an amount between 29.9 wt % and 53.1 wt %. These fibres can desirably contain an amount of $SiO_2$ greater than 2.76 wt % and less than 14.9 wt %.

Desirably, the amount of $Al_2O_3$ in the fibres is 48.8 wt % or less. In addition, it is desirable that the weight percentage of SrO relative to the total amount of SrO plus $Al_2O_3$ plus $SiO_2$ is greater than 53.7 wt % and less than 59.6 wt %. In an embodiment of the invention, the fibres comprise SrO in an amount of 53.2 wt % to 57.6 wt %, $Al_2O_3$ in an amount of 30.4 wt % to 40.1 wt %, and $SiO_2$ in an amount of 5.06 wt % to 10.1 wt %, more particularly SrO in an amount of 53.2 wt % to 54.9 wt %, $Al_2O_3$ in an amount of 39.9 wt % to 40.1 wt %, and $SiO_2$ in an amount of 5.06 wt % to 5.34 wt %.

DETAILED DESCRIPTION OF THE INVENTION

The scope of the invention is made clear in the appended claims with reference to the following description.

In the following, where reference is made to a saline soluble fibre, this is to be taken as meaning a fibre having a total solubility of greater than 10 ppm in saline solution as measured by the method described below, and preferably having much higher solubility.

The experiment results are described below with reference to Tables 1, 2, and 3.

Table 1 shows a series of compositions that were melted and blown in a conventional manner. Those compositions indicated as "&" did not form fibre to a useful extent but formed shot. For each of the compositions the analysed composition in weight percent (found from x-ray fluorescence analysis) is shown. Where a figure "<0.05" is shown this means that the component concerned could not be detected.

Owing to the nature of x-ray fluorescence measurements (which are sensitive to the surrounding environment) the total quantity of material found by analysis can add up to over 100% and in this patent specification (including the description claims and abstract) the figures have not been normalised to 100%. For each composition however the total quantity of analysed material is indicated and it can be seen that the variation from 100% is small. Under the column headed "Relative weight percent" the weight percentage of SrO, $Al_2O_3$ and $SiO_2$ to the total of these components is indicated. Except where the context dictates otherwise any percentages quoted in this specification should be taken as percentages as analysed by x-ray fluorescence analysis and not absolute percentages.

Table 2 shows (in the same order as Table 1) shrinkage and solubility data for the fibre forming compositions. Solubility is expressed as parts per million in solution as measured in the method described below.

All of the compositions above and including line A of Tables 1 and 2 include 2.76 wt % or less $SiO_2$. It can be seen that most of these compositions did not form fibre. Some of the fibres include $Na_2O$ in amounts of 2.46 wt % or more to assist fibre forming but show poor shrinkage characteristics at temperatures above 1000° C. (in the sense of more than 3.5% at measured temperature).

One fibre (SA5(2.5% K20/SiO2)) which contains 1.96% $K_2O$ and 2.69% $SiO_2$ has acceptable shrinkage at 1260° C.

Thus it can be seen that "pure" strontium aluminates do not form fibres whereas by addition of fibre forming additives (e.g. $SiO_2$ and $Na_2O$) fibres may be formed. The shrinkage characteristics of the resultant fibres depend upon the additives used.

The fibres below line A and above and including line B have a SrO content of less than 35 wt % and show poor shrinkage characteristics. The fibres shown below line B have a SrO content of greater than 35 wt % and where measured show acceptable shrinkage at 1260° C.

The fibre of line C comprises 2.52 wt % CaO and this appears to be damaging to performance at 1400° C. The fibres lying below line D and above and including line E have an $Al_2O_3$ content of greater than 48.8 wt % which appears to affect adversely the performance of the fibres at 1400° C. The fibre below line E has a $SiO_2$ content of 14.9 wt % which appears to be bad for 1400° C. performance (see below for 1500° C. performance).

A further limited range of compositions (shown as bold text under the column 1400° C.) tend to have an acceptable shrinkage at 1400° C. These compositions lie below line C and above and including line D of Tables 1 & 2. The two fibres indicated in this range that do not meet the 3.5% shrinkage requirement may just be anomalous results.

The fibres lying below line C and above and including line D have been sorted on relative weight percent SrO (as defined above) and it can be seen that those compositions with a relative weight percent SrO of greater than 53.7% and less than 59.6% tend to have acceptable shrinkages at 1500° C. The fibre in this region that does not have acceptable shrinkage at 1500° C. is a high $SiO_2$ fibre (12.2 wt % $SiO_2$) and this supports the deleterious effect of too much $SiO_2$ mentioned above.

Two fibres (SA5a and SA5aII) show acceptable shrinkage at 1550° C.

Additionally it can be seen that some of the fibres show enormous solubilities and so may provide usable refractory fibres that will dissolve in body fluids.

All of the fibres showed hydration on insertion into aqueous fluids, indeed they tended to show some hydration on forming the preforms that were used for shrinkage testing. After 24 hours solubility testing in physiological-type fluids the hydration is very evident. The hydration takes the form of apparent dissolution and re-precipitation of crystals on the fibre surface that results in it losing its fibrous nature.

For some of the compositions, in making the vacuum preforms for testing a dispersant and wetting agent was used (Troy EX 516-2 (Trade mark of Troy Chemical Corporation)) which is a mixture of non-ionic surfactants and chemically modified fatty acids. This was in an attempt to minimise the time of exposure to water and hence the extent of hydration. It can be seen from Table 3 (which shows the same type of information as Table 2) that those compositions where the dispersant was used (indicated as "troy") tend to have a higher shrinkage than the identical composition not using the dispersant. The applicants surmise that this may be due to the partial hydration "locking" the fibres together so that any one fibre has to shrink against the tension of supporting fibres along its length: such tension may lead to fibre thinning rather than longitudinal shrinkage. When the dispersant is used the fibres are free to shrink along their length.

The following describes in detail the methods used to measure shrinkage and solubility.

Shrinkage was measure by proposed ISO standard ISO/TC33/SC2/N220 (equivalent to British Standard BS1920 part 6.1986) with some modifications to account for small sample size. The method in summary comprises the manufacture of vacuum cast preforms, using 75 g of fibre in 500 $cm^3$ of 0.2% starch solution, into a 120×65 mm tool. Platinum pins (approximately 0. 5 mm diameter) were placed 100×45 mm apart in the 4 corners. The longest lengths (L1 & L2) and the diagonals (L3 & L4) were measured to an accuracy of ±5 $\mu$m using a travelling microscope. The samples were placed in a furnace and ramped to a temperature 50° C. below the test temperature at 300° C./hour and ramped at 120° C./hour for the last 50° C. to test temperature and left for 24 hours. The shrinkage values are given as an average of the 4 measurements.

It should be noted that although this is a standard way of measuring shrinkage of fibre it has an inherent variability in that the finished density of the preform may vary depending on casting conditions. Further it should be noted that fibre blanket will usually have a higher shrinkage than a preform made of the same fibre. Accordingly, the 3.5% figure mentioned in this specification is likely to translate as a higher shrinkage in finished blanket.

Solubility was measured by the following method.

The fibre was first chopped through a 10 mesh sieve and shot removed by hand sieving also through a 10 mesh sieve.

The solubility test apparatus comprised a shaking incubator water bath, and the test solution had the following composition:

| Compound | Name | Grams |
| --- | --- | --- |
| NaCl | Sodium chloride | 6.780 |
| $NH_4Cl$ | Ammonium chloride | 0.540 |
| $NaHCO_3$ | Sodium bicarbonate | 2.270 |
| $Na_2HPO_4H_2O$ | Disodium hydrogen phosphate | 0.170 |
| $Na_3C_6H_5O_7 \cdot 2H_2O$ | Sodium citrate dihydrate | 0.060 |
| $H_2NCH_2CO_{2H}$ | Glycine | 0.450 |
| $H_2SO_4$s.g. 1.84 | Sulphuric acid | 0.050 |

The above materials were diluted to 1 litre with distilled water to form a physiological-like saline solution.

0.500 grams±0.003 grams of chopped fibre was weighed into a plastic centrifuge tube and 25 cm³ of the above saline solution added. The fibre and saline solution was shaken well and inserted into the shaking incubator water bath maintained at body temperature (37° C.±1° C.). The shaker speed was set at 20 cycles/minute.

After 24 hours the centrifuge tube was removed then supernatant liquid was decanted and the liquid passed through a filter (0.45 micron cellulose nitrate membrane filter paper [WCN type from Whatman Labsales Limited]) into a clean plastic bottle. The liquid was then analyzed by one of two methods. The first method used was atomic absorption using a Thermo Jarrell Ash Smith-Hiefje II machine.

The operating conditions were as set out in the applicant's earlier earlier International Patent Applications WO93/15028 and WO94/15883. For SrO the operating conditions were:

| WAVELENGTH (nm) | BAND WIDTH | CURRENT (mA) | FLAME |
|---|---|---|---|
| 460.7 | 0 | 12 | Fuel Lean |

Strontium is measured against a standard atomic absorption solution (Aldrich 970 μm/ml). Three standards are prepared to which 0.1% KCl is added (Sr[ppm] 9.7, 3.9 & 1.9). Dilutions of ×10 and ×20 are normally made to measure Sr level in the sample. SrO is then calculated as 1.183×Sr.

All stock solutions were stored in plastic bottles.

In the second method used (which was shown to give results consistent with the first method) element concentrations were found by inductively coupled plasma-atomic emission spectroscopy in known manner.

The above has discussed resistance to shrinkage of preforms exposed to 1260° C. for 24 hours. This is an indication of the maximum use temperature of a fibre. In practice fibres are quoted for a maximum continuous use temperature and a higher maximum exposure temperature. It is usual in industry when selecting a fibre for use at a given temperature to choose a fibre having a higher continuous use temperature than that normally required for the intended use. This is so that any accidental increase in temperature does not damage the fibres. It is quite usual for a margin of 100 to 150° C. to be given.

The applicants are not certain as yet as to how much other oxides or other impurities will affect the performance of fibres as described above and the appendant claims allow, where $SiO_2$ is the fibre forming additive, up to 10 wt % of materials other than SrO, $Al_2O_3$ and $SiO_2$, although this should not be seen as limitative.

Although the above description has referred to manufacture of fibres by blowing from a melt the invention is not limited to blowing and also encompasses spinning and other techniques in which fibres are formed from a melt, and also encompasses fibres made by any other process.

TABLE 1

| Comp | SrO | $Al_2O_3$ | $SiO_2$ | CaO | MgO | $ZrO_2$ | BaO | $K_2O$ | $Na_2O$ | $P_2O_5$ | $Fe_2O_3$ | $Cr_2O_3$ | Total | SrO | $Al_2O_3$ | $SiO_2$ | |
|---|---|---|---|---|---|---|---|---|---|---|---|---|---|---|---|---|---|
| SA3 & | 33.1 | 60.9 | <0.05 | 0.08 | <0.05 | <0.05 | 0.20 | <0.05 | <0.05 | 0.06 | 1.92 | <0.05 | 94.34 | 35.2% | 64.8% | | |
| SA1 & | 61.4 | 37.1 | <0.05 | 0.08 | <0.05 | <0.05 | 0.30 | <0.05 | <0.05 | <0.05 | <0.05 | <0.05 | 98.58 | 62.3% | 37.7% | | |
| SA2 & | 48.5 | 49.7 | <0.05 | 0.06 | <0.05 | <0.05 | 0.24 | <0.05 | <0.05 | <0.05 | 0.64 | <0.05 | 98.50 | 49.4% | 50.6% | | |
| SA5 (5% Na2O) | 54.8 | 39.3 | 0.14 | 0.08 | <0.05 | <0.05 | 0.21 | <0.05 | 5.14 | <0.05 | <0.05 | <0.05 | 99.67 | 58.1% | 41.7% | 0.1% | |
| SA5 (2.5% Na2O) | 54.5 | 41.2 | 0.19 | 0.31 | <0.05 | <0.05 | 0.21 | <0.05 | 2.46 | <0.05 | <0.05 | <0.05 | 98.87 | 56.8% | 43.0% | 0.2% | |
| SA5c & | 50 | 39.4 | 2.51 | 0.08 | 3.29 | <0.05 | 0.21 | <0.05 | <0.05 | <0.05 | 1.07 | <0.05 | 98.56 | 54.4% | 42.9% | 2.7% | |
| SA8c & | 24.1 | 72.9 | 2.52 | 0.06 | <0.05 | <0.05 | 0.10 | <0.05 | 0.12 | <0.05 | <0.05 | <0.05 | 99.80 | 24.2% | 73.3% | 2.5% | |
| SA3c & | 39.9 | 55.4 | 2.55 | 0.07 | 0.12 | <0.05 | 0.19 | <0.05 | <0.05 | <0.05 | <0.05 | <0.05 | 98.31 | 40.8% | 56.6% | 2.6% | |
| SA5 (2.5% Na2O/SiO2) | 56.4 | 38.8 | 2.57 | 0.20 | 0.08 | <0.05 | 0.21 | <0.05 | 2.57 | <0.05 | <0.05 | <0.05 | 100.83 | 57.7% | 39.7% | 2.6% | |
| SA5 (2.5% K2O/SiO2) | 56.3 | 38.8 | 2.69 | 0.13 | <0.05 | <0.05 | 0.21 | 1.86 | 0.15 | <0.05 | 0.36 | <0.05 | 100.50 | 57.6% | 39.7% | 2.8% | |
| SA9c & | 44.5 | 52 | 2.71 | 0.07 | <0.05 | <0.05 | 0.17 | <0.05 | <0.05 | <0.05 | 0.05 | <0.05 | 99.50 | 44.9% | 52.4% | 2.7% | |
| SA4c & | 54.5 | 37.3 | 2.74 | 0.30 | 0.16 | 0.54 | 0.66 | <0.05 | 0.22 | <0.05 | 0.;08 | <0.05 | 96.50 | 57.6% | 39.5% | 2.9% | |
| SA2c & | 48.1 | 47.1 | 2.76 | 0.08 | <0.05 | <0.05 | 0.22 | <0.05 | <0.05 | <0.05 | 0.08 | <0.05 | 98.34 | 49.1% | 48.1% | 2.8% | A |
| SA8b | 22.9 | 65.7 | 9.62 | 0.06 | <0.05 | <0.05 | <0.05 | <0.05 | <0.05 | <0.05 | 0.06 | <0.05 | 98.28 | 23.3% | 66.9% | 9.8% | |
| SA7b | 26.2 | 62.4 | 9.62 | 0.10 | <0.05 | <0.05 | <0.05 | <0.05 | <0.05 | <0.05 | 0.08 | <0.05 | 98.32 | 26.7% | 63.5% | 9.8% | |
| SA7a | 27.4 | 62.2 | 9.20 | 0.06 | <0.05 | 0.06 | 0.16 | <0.05 | <0.05 | <0.05 | 0.10 | <0.05 | 99.18 | 27.7% | 63.0% | 9.3% | |
| SA6b | 32.9 | 56.1 | 9.43 | 0.06 | <0.05 | <0.05 | 0.16 | <0.05 | <0.05 | <0.05 | 0.18 | <0.05 | 98.65 | 33.4% | 57.0% | 9.6% | |
| SA6d | 32.9 | 58.8 | 7.09 | 0.07 | <0.05 | <0.05 | 0.11 | <0.05 | 0.10 | <0.05 | <0.05 | <0.05 | 99.07 | 33.3% | 59.5% | 7.2% | |
| SA6a | 33.6 | 59.5 | 5.12 | 0.08 | 0.14 | <0.05 | 0.20 | <0.05 | <0.05 | <0.05 | <0.05 | <0.05 | 98.64 | 34.2% | 60.6% | 5.2% | B |
| SACS1 | 53.9 | 37.8 | 5.25 | 2.52 | 0.18 | <0.05 | 0.23 | <0.05 | 0.13 | <0.05 | <0.05 | <0.05 | 100.01 | 55.6% | 39.0% | 5.4% | C |
| SAR8 | 44.7 | 47.4 | 7.65 | 0.07 | 0.10 | <0.05 | 0.19 | <0.05 | 0.10 | <0.05 | <0.05 | <0.05 | 100.20 | 44.8% | 47.5% | 7.7% | |
| SAR5 | 45 | 44.9 | 9.77 | 0.06 | <0.05 | <0.05 | 0.17 | <0.05 | 0.09 | <0.05 | <0.05 | <0.05 | 100.00 | 45.1% | 45.0% | 9.8% | |
| SAR9 | 47.5 | 45.4 | 5.30 | 0.24 | 0.11 | <0.05 | 0.209 | <0.05 | 0.19 | <0.05 | 0.05 | <0.05 | 99.00 | 48.4% | 46.2% | 5.4% | |
| SA2a | 48.9 | 44.8 | 4.72 | 0.08 | <0.05 | <0.05 | 0.24 | <0.05 | <0.05 | <0.05 | 0.32 | <0.05 | 99.06 | 49.7% | 45.5% | 4.8% | |
| SAR4 | 50.5 | 39.8 | 9.85 | 0.07 | <0.05 | <0.05 | 0.18 | <0.05 | 0.13 | <0.05 | <0.05 | <0.05 | 100.50 | 50.4% | 39.7% | 9.8% | |
| SAR7 | 50.8 | 42.3 | 7.41 | 0.07 | 0.05 | <0.05 | 0.18 | <0.05 | 0.13 | <0.05 | <0.05 | <0.05 | 100.90 | 50.5% | 42.1% | 7.4% | |
| SAR1 | 52.2 | 35.7 | 12.00 | 0.09 | 0.05 | 0.15 | 0.20 | <0.05 | 0.12 | <0.05 | 0.05 | <0.05 | 100.60 | 52.3% | 35.7% | 12.0% | |
| SA5d | 53 | 39 | 7.63 | 0.10 | 0.12 | <0.05 | 0.22 | <0.05 | 0.23 | <0.05 | <0.05 | <0.05 | 100.30 | 53.2% | 39.1% | 7.7% | |

TABLE 1-continued

| | Composition wt % | | | | | | | | | | | | | Relative weight percent (to total SrO + Al₂O₃ + SiO₂) | | | |
|---|---|---|---|---|---|---|---|---|---|---|---|---|---|---|---|---|---|
| Comp | SrO | Al₂O₃ | SiO₂ | CaO | MgO | ZrO₂ | BaO | K₂O | Na₂O | P₂O₅ | Fe₂O₃ | Cr₂O₃ | Total | SrO | Al₂O₃ | SiO₂ | |
| SA5d II | 54.2 | 39.6 | 7.57 | 0.08 | 0.08 | <0.05 | 0.20 | <0.05 | 0.23 | <0.05 | 0.07 | <0.05 | 101.96 | 53.5% | 39.1% | 7.5% | |
| SA5b | 52.3 | 35.1 | 10.00 | 0.10 | 0.12 | <0.05 | 0.24 | <0.05 | <0.05 | <0.05 | <0.05 | <0.05 | 97.86 | 53.7% | 36.0% | 10.3% | |
| SA5a | 53.2 | 39.9 | 5.34 | 0.14 | <0.05 | <0.05 | 0.26 | <0.05 | <0.05 | <0.05 | <0.05 | <0.05 | 98.84 | 54.0% | 40.5% | 5.4% | |
| SA5a II | 54.9 | 40.1 | 5.06 | 0.08 | <0.05 | <0.05 | 0.26 | <0.05 | <0.05 | <0.05 | <0.05 | <0.05 | 100.89 | 54.9% | 40.1% | 5.1% | |
| SAR10 | 56.4 | 37.3 | 6.01 | 0.14 | 0.10 | <0.05 | 0.21 | <0.05 | 0.19 | <0.05 | 0.07 | <0.05 | 100.40 | 56.6% | 37.4% | 6.0% | |
| SA4d | 56.7 | 34.1 | 7.37 | 0.12 | 0.08 | <0.05 | 0.22 | <0.05 | 0.16 | <0.05 | 0.06 | <0.05 | 98.75 | 57.8% | 34.7% | 7.5% | |
| SAR12 | 57.4 | 29.2 | 12.20 | 0.09 | 0.09 | <0.05 | 0.23 | <0.05 | 0.19 | <0.05 | <0.05 | <0.05 | 99.40 | 58.1% | 29.6% | 12.3% | |
| SA4b | 57.6 | 30.4 | 10.10 | 0.08 | <0.05 | <0.05 | 0.30 | <0.05 | <0.05 | <0.05 | <0.05 | <0.05 | 96.48 | 58.7% | 31.0% | 10.3% | |
| SA4a | 58.6 | 34.4 | 5.35 | 0.10 | <0.05 | <0.05 | 0.20 | <0.05 | <0.05 | <0.05 | 0.18 | <0.05 | 98.83 | 59.6% | 35.0% | 5.4% | |
| SAR3 | 61.3 | 29.9 | 9.73 | 0.09 | <0.05 | <0.05 | 0.23 | <0.05 | 0.10 | <0.05 | <0.05 | <0.05 | 101.40 | 60.7% | 29.6% | 9.6% | |
| SAR6 | 61.7 | 32.4 | 7.44 | 0.08 | <0.05 | <0.05 | 0.22 | <0.05 | 0.11 | <0.05 | <0.05 | <0.05 | 102.00 | 60.8% | 31.9% | 7.3% | |
| SA1a | 63.8 | 29.9 | 4.84 | 0.08 | <0.05 | <0.05 | 0.30 | <0.05 | <0.05 | 0.08 | 0.18 | 0.06 | 99.22 | 64.7% | 30.3% | 4.9% | D |
| SA9a | 44 | 48.9 | 4.95 | 0.07 | <0.05 | <0.05 | 0.21 | <0.05 | <0.05 | <0.05 | <0.05 | <0.05 | 98.13 | 45.0% | 50.0% | 5.1% | |
| SA3a | 41.2 | 53.1 | 4.74 | 0.06 | <0.05 | <0.05 | 0.22 | <0.05 | <0.05 | <0.05 | 0.06 | <0.05 | 99.38 | 41.6% | 53.6% | 4.8% | E |
| SAR2 | 54.9 | 30.6 | 14.90 | 0.08 | 0.05 | 0.08 | 0.19 | <0.05 | 0.10 | <0.05 | <0.05 | <0.05 | 100.90 | 54.7% | 30.5% | 14.8% | |

TABLE 2

| | Shrinkage at 24 hours (° C.) | | | | | | | | | Relative weight percent (to total SrO + Al₂O₃ + SiO₂) | | | Solubility ppm | | | | |
|---|---|---|---|---|---|---|---|---|---|---|---|---|---|---|---|---|---|
| Comp | 1000 | 1200 | 1260 | 1350 | 1400 | 1450 | 1500 | 1550 | 1600 | SrO | Al₂O₃ | SiO₂ | SrO | Al₂O₃ | SiO₂ | Total | |
| SA3 & | | | | | | | | | | 35.2% | 64.8% | | | | | | |
| SA1 & | | | | | | | | | | 62.3% | 37.7% | | | | | | |
| SA2 & | | | | | | | | | | 49.4% | 50.6% | | | | | | |
| SA5 (5% Na2O) | | | | | 8.22 | | | | | 58.1% | 41.7% | 0.1% | 65 | 1000 | 1 | 1066 | |
| SA5 (2.5% Na2O) | 3.38 | | 8.64 | | | | | | | 56.8% | 43.0% | 0.2% | 1 | 563 | 1 | 565 | |
| SA5c & | | | | | | | | | | 54.4% | 42.9% | 2.7% | | | | | |
| SA8c & | | | | | | | | | | 24.2% | 73.3% | 2.5% | | | | | |
| SA3c & | | | | | | | | | | 40.8% | 56.6% | 2.6% | | | | | |
| SA5 (2.5% Na2O/SiO2) | 2.39 | 3.95 | 6.53 | | | | | | | 57.7% | 39.7% | 2.6% | 10 | 500 | 1 | 511 | |
| SA5(2.5% K2O/SiO2) | | | 3.02 | | | | | | | 57.6% | 39.7% | 2.8% | 11 | | 2 | 13 | |
| SA9c & | | | | | | | | | | 44.9% | 52.4% | 2.7% | | | | | |
| SA4c & | | | | | | | | | | 57.6% | 39.5% | 2.9% | | | | | |
| SA2c & | | | | | | | | | | 49.1% | 48.1% | 2.8% | | | | | |
| SA8b | 10.16 | | 12.1 | | | | | | | 23.3% | 66.9% | 9.8% | 5 | 2 | 3 | 10 | |
| SA7b | 4.82 | | 5.33 | | | | | | | 26.7% | 63.5% | 9.8% | | | | | |
| SA7a | 4.4 | | 5.4 | | 9.94 | | | | | 27.7% | 63.0% | 9.3% | 4 | 2 | 2 | 8 | |
| SA6b | 3.62 | | 6.42 | | | | | | | 33.4% | 57.0% | 9.6% | 5 | 1 | 1 | 7 | |
| SA6d | | | 7.48 | | 7.8 | | | | | 33.3% | 59.5% | 7.2% | 4 | 1 | 1 | 6 | |
| SA6a | 7.02 | | 8.81 | | | 6.52 | | | | 34.2% | 60.6% | 5.2% | 8 | 2 | 3 | 13 | B |
| SACS1 | | | 2.15 | | 4.8 | | | | | 55.6% | 39.0% | 5.4% | 26 | 1 | 2 | 29 | C |
| SAR8 | | 0.94 | | | 1.14 | 7.86 | 39.6 | | | 44.8% | 47.5% | 7.7% | 6 | | | 6 | |
| SAR5 | | 1.55 | | | 1.61 | 1.70 | 33.6 | | | 45.1% | 45.0% | 9.8% | 8 | 2 | 1 | 11 | |
| SAR9 | 1.25 | 2.52 | 2.85 | 3.77 | 5.91 | | | | | 48.4% | 46.2% | 5.4% | 10 | | 10 | 20 | |
| SA2a | | | 1.61 | | 2.67 | 7.75 | | | | 49.7% | 45.5% | 4.8% | 10 | 1 | 6 | 17 | |
| SAR4 | | 1.06 | | | 1.6 | 3.19 | 31.1 | | | 50.4% | 39.7% | 9.8% | 6 | | | 6 | |
| SAR7 | | 1.07 | | 2.26 | 2.94 | 4.7 | | | | 50.5% | 42.1% | 7.4% | 7 | | | 7 | |
| SAR1 | 0.75 | 1.10 | 1.19 | 1.36 | 2.14 | 25.25 | | | | 52.3% | 35.7% | 12.0% | 14 | | 1 | 15 | |
| SA5d | | | | | 1.36 | | 4.21 | | | 53.2% | 39.1% | 7.7% | 17 | 1 | 1 | 19 | |
| SA5d II | | | | | 1.3 | | 4.13 | | | 53.5% | 39.1% | 7.5% | | | | | |
| SA5b | 0.6 | | 0.69 | | 0.66 | 2.6 | 4.7 | | | 53.7% | 36.0% | 10.3% | 11 | | 3 | 14 | |
| SA5a | | | 0.89 | | 1.1 | | 1.78 | 3.19 | 5.88 | 54.0% | 40.5% | 5.4% | 45 | | 2 | 47 | |
| SA5a II | | | | | 2.71 | 2.75 | 2.86 | 3.14 | 9.46 | 54.9% | 40.1% | 5.1% | | | | | |
| SAR10 | 2.18 | 2.2 | 2.23 | | 2.48 | | 2.51 | Melts | | 56.6% | 37.4% | 6.0% | 56 | | 7 | 63 | |
| SA4d | | | | | 1.69 | 2.77 | 3.36 | | 6.9 | 57.8% | 34.7% | 7.5% | 15 | 1 | 2 | 18 | |
| SAR12 | | 1.4 | 1.4 | | 1.31 | | Melts | | | 58.1% | 29.6% | 12.3% | 25 | | 2 | 27 | |
| SA4b | 0.55 | | 0.41 | | 1.19 | 1.16 | 1.93 | | | 58.7% | 31.0% | 10.3% | 15 | | 3 | 18 | |
| SA4a | | | 1.56 | | 4.6 | | | | | 59.6% | 35.0% | 5.4% | 19 | 1 | 2 | 22 | |
| SAR3 | | 1.49 | 1.35 | 1.98 | 2.21 | 5.31 | | | | 60.7% | 29.6% | 9.6% | 22 | | 2 | 24 | |
| SAR6 | | 1.42 | | | 2.22 | 2.42 | 6.36 | 8.19 | | 60.8% | 31.9% | 7.3% | 15 | | | 15 | |
| SA1a | | | 2.37 | | | 8.57 | | | | 64.7% | 30.3% | 4.9% | 161 | 897 | 4 | 1062 | D |
| SA9a | | | | | 7.19 | | | | | 45.0% | 50.0% | 5.1% | 5 | 1 | 1 | 7 | |
| SA3a | 1.12 | | 2.45 | 3.94 | 6.43 | | | | | 41.6% | 53.6% | 4.8% | 12 | 3 | 6 | 21 | E |
| SAR2 | | 0.73 | 2.00 | 3.94 | 8.43 | | | | | 54.7% | 30.5% | 14.8% | 14 | | 2 | 16 | |

TABLE 3

| Comp | Shrinkage at 24 hours (° C.) | | | | | | | | | Relative weight percent (to total SrO + Al₂O₃ + SiO₂) | | | Solubility | | | |
|---|---|---|---|---|---|---|---|---|---|---|---|---|---|---|---|---|
| | 1000 | 1200 | 1260 | 1350 | 1400 | 1450 | 1500 | 1550 | 1600 | SrO | Al₂O₃ | SiO₂ | SrO | Al₂O₃ | SiO₂ | Total |
| SA4d | | | | | 1.69 | 2.77 | 3.36 | | 6.9 | 57.8% | 34.7% | 7.5% | 13 | 1 | 1 | 5 |
| SA4d (troy) | | | | | 3.12 | 3.86 | 4.72 | | 13.62 | 57.8% | 34.7% | 7.5% | | | | |
| SA5a II | | | | | 2.71 | 2.75 | 2.86 | 3.14 | | 54.9% | 40.1% | 5.1% | | | | |
| SA5a II-troy | | | | | 1.56 | | | | 14.2 | 54.9% | 40.1% | 5.1% | | | | |
| SA5d | | | | | 1.36 | | 4.21 | | | 53.2% | 39.1% | 7.7% | 17 | 1 | 1 | 19 |
| SA5d (troy) | | | | | 0.93 | | 6.04 | | | 53.2% | 39.1% | 7.7% | | | | |
| SA5d II | | | | | 1.3 | | 4.13 | | | 53.5% | 39.1% | 7.5% | | | | |
| SA5d II (troy) | | | | | 1.35 | | 5.21 | | | 53.5% | 39.1% | 7.5% | | | | |
| SA5 (2.5% Na2O/SiO2) | 2.39 | 3.95 | 6.53 | | | | | | | 57.8% | 39.7% | 2.6% | | | | |
| SA5 (2.5% Na2O/SiO2) troy | | | 7.17 | | | | | | | 57.7% | 39.7% | 2.6% | | | | |
| SA5 (5% Na2O) | | | | | | 8.22 | | | | 58.1% | 41.7% | 0.1% | 50 | 1200 | 1 | 125 |
| SA5 (5% Na2O) troy | | | | | | 14.47 | | | | 58.1% | 41.7% | 0.1% | | | | |
| SA6b | 3.62 | | 6.42 | | | | | | | 33.4% | 57.0% | 9.6% | 7 | 2 | 2 | 11 |
| SA6b (troy) | | | 13.18 | | | | | | | 33.4% | 57.0% | 9.6% | | | | |

I claim:

1. An inorganic fibre, a vacuum preform of which has a shrinkage of 3.5% or less when exposed to a temperature of 1260° C. for 24 hours, the fibre having a strontium aluminate composition comprising SrO in an amount of 35 wt % or greater based upon the total fibre composition, $Al_2O_3$, and an amount of fibre forming additive effective to allow fibre formation, the amount of said fibre forming additive being not so great as to increase shrinkage beyond 3.5%, and in which, when $SiO_2$ is present, the amount of $SiO_2$ is less than 14.9 wt % based upon the total fiber composition.

2. An inorganic fibre as claimed in claim 1, in which the fibre forming additive comprises $SiO_2$ and the constituents SrO, $Al_2O_3$ and $SiO_2$ comprise at least 90 wt % of the fibre composition.

3. An inorganic fibre as claimed in claim 2 in which the constituents SrO, $Al_2O_3$ and $SiO_2$ comprise at least 95 wt % of the fibre composition.

4. An inorganic fibre as claimed in claim 1, a vacuum preform of which has a shrinkage of 3.5% or less when exposed to 1400° C. for 24 hours.

5. An inorganic fibre as claimed in claim 1, wherein the amount of $Al_2O_3$ is 48.8 wt % or less.

6. An inorganic fibre as claimed in claim 1, a vacuum preform of which has a shrinkage of 3.5% or less when exposed to 1500° C. for 24 hours.

7. An inorganic fibre as claimed in claim 5, wherein the weight percentage of SrO calculated based upon the total of the amount of SrO plus the amount of $Al_2O_3$ plus the amount of $SiO_2$ is in the range greater than 53.7 wt % to less than 59.6 wt %.

8. An inorganic fibre as claimed in claim 1 in which the fibre forming additive comprises $Na_2O$ in an amount less than 2.46 wt %.

9. An inorganic fibre as claimed in claim 1, a vacuum preform of which has a shrinkage of 3.5% or less when exposed to 1550° C. for 24 hours.

10. An inorganic fibre, a vacuum preform of which has a shrinkage of 3.5% or less when exposed to 1260° C. for 24 hours, the fibre having a strontium aluminate composition comprising

| SrO | 41.2 wt %–63.8 wt %; |
|---|---|
| $Al_2O_3$ | 29.9 wt %–53.1 wt %; | and an amount of fibre forming additive effective to allow fibre formation, the amount of said fibre forming additive being not so great as to increase shrinkage beyond 3.5%.

11. An inorganic fibre, a vacuum preform of which has a shrinkage of 3.5% or less when exposed to 1260° C. for 24 hours, the fibre having a strontium aluminate composition comprising:

| SrO | 41.2 wt %–63.8 wt % |
|---|---|
| $Al_2O_3$ | 29.9 wt %–53.1 wt % and |
| $SiO_2$ | 2.76 wt %–14.9 wt % as a fibre forming additive effective to allow fibre formation. |

12. The inorganic fiber according to claim 11, wherein the combined weight of SrO, $Al_2O_3$, and $SiO_2$ is at least 90 wt % of the fiber composition.

13. The inorganic fiber according to claim 12, wherein the combined weight of SrO, $Al_2O_3$, and $SiO_2$ is at least 95 wt % of the fiber composition.

14. The inorganic fiber according to claim 12, comprising in wt % based upon the total weight of fiber composition:

| SrO | 53.2 wt %–57.6 wt %; |
|---|---|
| $Al_2O_3$ | 30.4 wt %–40.1 wt %; |
| $SiO_2$ | 5.06 wt %–10.1 wt %. - - - |

15. The inorganic fiber according to claim 12, comprising in wt % based upon the total weight of fiber composition:

| SrO | 53.2 wt %–54.9 wt %; |
|---|---|
| $Al_2O_3$ | 39.9 wt %–40.1 wt %; |
| $SiO_2$ | 5.06 wt %–5.34 wt %; |

16. An inorganic fibre a vacuum preform of which has a shrinkage of 3.5% or less when exposed to 1260° C. for 24 hours and a shrinkage of 3.5% or less when exposed to 1500° C. for 24 hours, the fibre having a strontium aluminate composition comprising in wt %:

| | |
|---|---|
| SrO | 53.2 wt %–57.6 wt %; |
| $Al_2O_3$ | 30.4 wt %–40.1 wt %; |
| $SiO_2$ | 5.06 wt %–10.1 wt %; | and wherein the weight percentage of SrO relative to the total amount of SrO plus $Al_2O_3$ plus $SiO_2$ is in the range greater than 53.7 wt % to less than 59.6 wt %.

17. An inorganic fibre a vacuum preform of which has a shrinkage of 3.5% or less when exposed to 1260° C. for 24 hours and a shrinkage of 3.5% or less when exposed to 1500° C. for 24 hours, the fibre having a strontium aluminate composition, calculated based upon the total fiber composition comprising:

| | |
|---|---|
| SrO | 53.2 wt %–54.9 wt %; |
| $Al_2O_3$ | 39.9 wt %–40.1 wt %; |
| $SiO_2$ | 5.06 wt %–5.34 wt %; | and wherein the weight percentage of SrO calculated based upon the total of the amount of SrO plus the amount of $Al_2O_3$ plus the amount of $SiO_2$ is in the range greater than 53.7 wt % to less than 59.6 wt %.

18. A process for the formation of fibres from a melt comprising predominantly SrO and $Al_2O_3$, the process comprising the steps of (1) adding minor amounts of $SiO_2$ to the melt to allow fibre formation, the constituents SrO, $Al_2O_3$, and $SiO_2$ comprising at least 90 wt % of the melt and $SiO_2$ comprising less than 14.9 wt % of the melt, and (2) forming at least one fibre from the melt.

19. Thermal insulation in a form selected from the group consisting of bulk, mat, blanket, vacuum formed shapes, boards, and papers, ropes, yarns, and textiles, comprising an inorganic fiber, a vacuum preform of which has a shrinkage of 3.5% or less when exposed to 1260° C. for 24 hours, the fiber having a strontium aluminate composition comprising SrO in an amount of 35 wt % or greater, $Al_2O_3$, and an amount of fiber forming additive effective to allow fiber formation, the amount of said fiber forming additive being not so great as to increase shrinkage of the vacuum preform above 3.5%, and wherein, when $SiO_2$ is present in the inorganic fiber, the amount of $SiO_2$ is less than 14.9 wt %.

20. An inorganic fiber comprising SrO, $Al_2O_3$, and $SiO_2$, comprising amounts thereof in wt % based upon the weight of the total fiber composition, selected from the group consisting of:

| SrO | $Al_2O_3$ | $SiO_2$ |
|---|---|---|
| 41.2 | 53.1 | 4.74 |
| 44.7 | 47.4 | 7.65 |
| 45.0 | 44.9 | 9.77 |
| 47.5 | 45.4 | 5.30 |
| 48.9 | 44.8 | 4.72 |
| 50.5 | 39.8 | 9.85 |
| 50.8 | 42.3 | 7.41 |
| 52.2 | 35.7 | 12.00 |
| 52.3 | 35.1 | 10.00 |
| 53.0 | 39.0 | 7.63 |
| 53.2 | 39.9 | 5.34 |
| 53.9 | 37.8 | 5.25 |
| 54.2 | 39.6 | 7.57 |
| 54.9 | 40.1 | 5.06 |
| 54.9 | 30.6 | 14.90 |
| 56.3 | 38.8 | 2.69 |
| 56.4 | 37.3 | 6.01 |
| 56.7 | 34.1 | 7.37 |
| 57.4 | 29.2 | 12.20 |
| 57.6 | 30.4 | 10.10 |
| 58.6 | 34.4 | 5.35 |
| 61.3 | 29.9 | 9.73 |
| 61.7 | 32.4 | 7.44 and |
| 63.8 | 29.9 | 4.84. - - - |

21. An inorganic fiber comprising SrO, $Al_2O_3$, and $SiO_2$, comprising in wt % based upon the total weight of the fiber composition:

| | |
|---|---|
| SrO | 41.2 to 63.8; |
| $Al_2O_3$ | 29.2 to 53.1; |
| $SiO_2$ | 2.69 to 14.9; |

22. An inorganic fiber comprising SrO, $Al_2O_3$, and $SiO_2$, comprising amounts thereof in wt % based upon the weight of the total fiber composition, selected from the group consisting of:

| SrO | $Al_2O_3$ | $SiO_2$ |
|---|---|---|
| 53.9 | 37.8 | 5.25 |
| 47.5 | 45.4 | 5.30 |
| 58.6 | 34.4 | 5.35 |
| 63.8 | 29.9 | 4.84 |
| 41.2 | 53.1 | 4.74 and |
| 54.9 | 30.6 | 14.9. - - - |

23. An inorganic fiber comprising SrO, $Al_2O_3$, and $SiO_2$, comprising amounts thereof in wt % based upon the weight of the total fiber composition, selected from the group consisting of:

| SrO | $Al_2O_3$ | $SiO_2$ |
|---|---|---|
| 44.7 | 47.4 | 7.65 |
| 45.0 | 44.9 | 9.77 |
| 48.9 | 44.8 | 4.72 |
| 50.5 | 3.98 | 8.85 |
| 50.8 | 42.3 | 7.41 |
| 52.2 | 35.7 | 12.00 |
| 52.3 | 35.1 | 10.00 |
| 53.0 | 39.0 | 7.63 |
| 53.2 | 39.9 | 5.34 |
| 54.2 | 39.6 | 7.57 |
| 54.9 | 40.1 | 5.06 |
| 56.3 | 38.8 | 2.69 |
| 56.4 | 37.3 | 6.01 |
| 56.7 | 34.1 | 7.37 |
| 57.4 | 29.2 | 12.20 |
| 57.6 | 30.4 | 10.10 |
| 61.3 | 29.9 | 9.73 and |
| 61.7 | 32.4 | 7.44. - - - |

* * * * *

UNITED STATES PATENT AND TRADEMARK OFFICE
CERTIFICATE OF CORRECTION

PATENT NO. : 5,998,315
DATED : December 7, 1999
INVENTOR(S) : Gary Anthony Jubb

It is certified that error appears in the above-identified patent and that said Letters Patent is hereby corrected as shown below:

<u>Column 4,</u>
Line 63, in table, column entitled Compound, delete the sixth compound "$H_2NCH_2CO_{2H}$" and add -- $H_2NCH_2CO_2H$ --

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*